March 31, 1942.     H. J. FISHER     2,278,070

AUXILIARY TREAD FOR DUAL WHEEL ASSEMBLIES

Filed Dec. 31, 1940     2 Sheets-Sheet 1

Inventor

Howard J. Fisher

By Clarence A. O'Brien

Attorney

March 31, 1942.    H. J. FISHER    2,278,070
AUXILIARY TREAD FOR DUAL WHEEL ASSEMBLIES
Filed Dec. 31, 1940    2 Sheets-Sheet 2

Inventor

Howard J. Fisher

By Clarence A. O'Brien

Attorney

Patented Mar. 31, 1942

2,278,070

UNITED STATES PATENT OFFICE 2,278,070

AUXILIARY TREAD FOR DUAL WHEEL ASSEMBLIES

Howard J. Fisher, Crestline, Ohio

Application December 31, 1940, Serial No. 372,667

2 Claims. (Cl. 152—151).

This invention relates to new and useful improvements in vehicle wheels and has as its principal object to provide an auxiliary tread for the dual wheel assemblies of various types of heavy duty trucks, trailers and carriages such as are used in the Army service.

An important object of the invention is to provide an auxiliary tread unit for dual wheel assemblies which is adapted to be interposed between the tires of a dual wheel assembly to not only fill in and prevent the accumulation of foreign matter between the wheels, but also to bridge the treads of the wheels to define a continuous unbroken and increased traction surface for the assembly.

Still another important object of the invention is to provide an auxiliary traction increasing unit of the character stated for dual wheel assemblies which can be readily disposed in place and which will require no modification of present day dual wheel assemblies.

Various other important objects and advantages of the invention will become apparent to the reader of the following specification.

Figure 1:
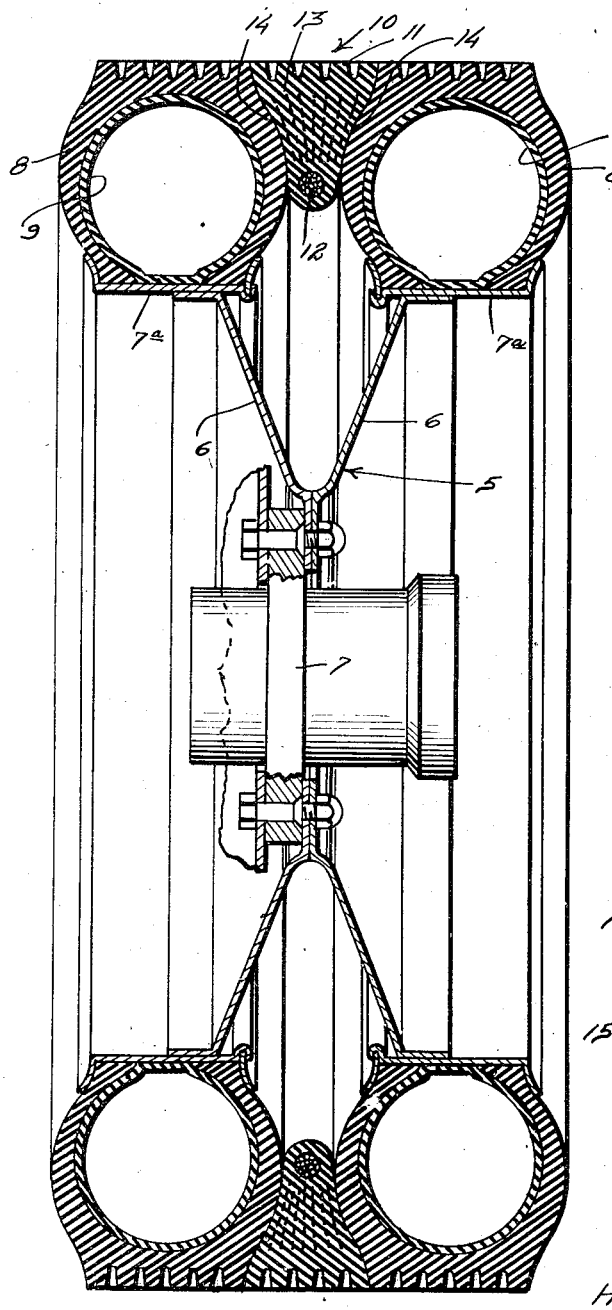
Figure 1 represents a vertical sectional view through a dual wheel assembly showing the auxiliary traction unit installed.

Referring to the drawings wherein like numerals designate like parts, it can be seen that numeral 5 generally refers to a dual wheel assembly including diverged wheel webs 6, 6 extending in diverged relation from a hub flange 7 and each equipped at its outer portion with a rim 7a on which is placed a tire 8 containing a pneumatic tube 9.

The tires 8 are conventionally spaced apart and in this space accumulate rocks, sticks and various other foreign matter which, of course, act to cause wear on the side walls of the tires 8.

The present invention is generally referred to by numeral 10 and consists of an annulus preferably molded in a solid body. The annulus transversely increases in size outwardly from its inner edge, its outermost side being substantially broad and provided with an irregular tread formed surface 11. The narrow inner edge portion has a cable or a mass of wire strands 12 embedded therein and from this point to the tread 11 fabric strips or the like 13 are embedded in the annulus.

Figure 4:
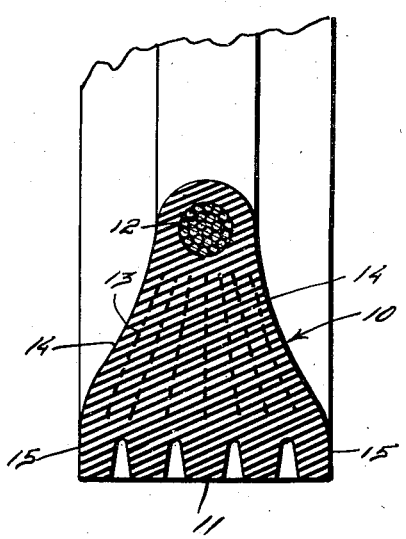
Figure 4 is an enlarged fragmentary sectional view taken substantially on the line 4—4 of Figure 2.
Figure 2:
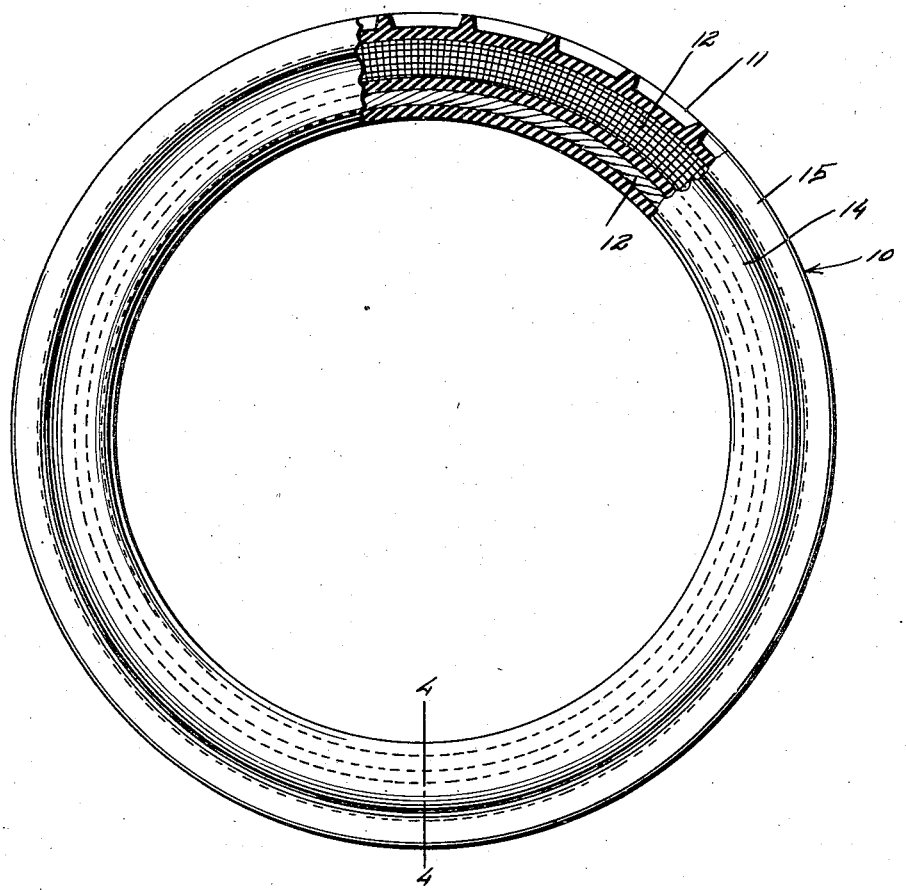
Figure 2 is a fragmentary side elevational view of the unit with a portion in longitudinal section.
Figure 3:
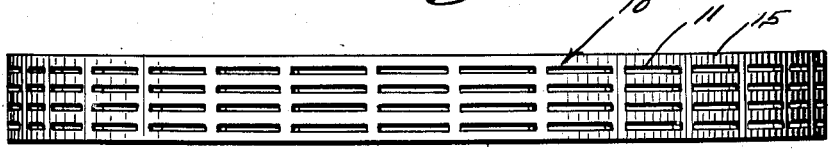
Figure 3 is a top plan view of the unit.

As can be seen in Figure 4, the annulus 10 has curved side walls 14 which are so shaped as to conform with the curvature of the opposed side walls of the tires 8. The outer portions 15 of the side walls of the annulus 10 are further formed to fit against the opposed side walls of the tread portions of the tires 8, 8. Thus are auxiliary traction unit will set between the dual wheel assembly in the manner substantially shown in Figure 1 and obviously it can be applied or removed by simply removing one of the tires 8.

The cable 12 serves to prevent any increase in the circumference of the annulus and the cable and the center of the tires are positioned substantially equi-distantly from the axis of the wheels for reinforcing the inner edge of the annulus against lateral compressing action of the sides of the tires, while the wider portion of the annulus will respond to compressing action against its sides by the tires and produce a wedging action against the annulus to more firmly hold the annulus against movement between the tires and thus prevent rubbing and wearing of the inner sides of the tires during operation of the vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a dual vehicle wheel assembly including a pair of pneumatic tires mounted in spaced relation to each other on a wheel, an annulus of substantially triangular cross-section and adapted for interposition between the tires, said annulus having a transversely plane relatively wide peripheral portion and a cable embedded in the innermost reduced portion of the annulus, the center of the cable and the center of the tires being substantially equidistant from the axis of the wheel for reinforcing the innermost reduced portion of the annulus at the narrowest point between the adjacent side walls of the tires to increase the transverse rigidity of the innermost reduced portion of the annulus and to adapt the same to resist compressing action by the internal pressure in the tires, the wider portion of the annulus being responsive to internal pressure of the tires for compressing said wider portion of the annulus and wedging the annulus in position between the tires.

2. In a dual vehicle wheel assembly including a pair of pneumatic tires mounted in spaced relation to each other on a wheel, an annulus of substantially triangular cross-section and adapted for interposition between the tires, said annulus having a transversely plane relatively wide peripheral portion and a cable embedded in the innermost reduced portion of the annulus, the center of the cable and the center of the tires being substantially equidistant from the axis of the wheel for reinforcing the innermost reduced portion of the annulus at the narrowest point between the adjacent side walls of the tires to increase the transverse rigidity of the innermost reduced portion of the annulus and to adapt the same to resist compressing action by the internal pressure in the tires, the wider portion of the annulus being responsive to internal pressure of the tires for compressing said wider portion of the annulus and wedging the annulus in position between the tires, and a plurality of strips of fabric extending circumferentially in the annulus and being radially disposed from the cable toward the peripheral portion of the annulus.

HOWARD J. FISHER.